(12) United States Patent
Zischka

(10) Patent No.: US 8,123,249 B2
(45) Date of Patent: Feb. 28, 2012

(54) GAS GENERATOR AND ASSEMBLY WITH A GAS GENERATOR

(75) Inventor: Gerd Zischka, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 123 days.

(21) Appl. No.: 12/290,941

(22) Filed: Nov. 5, 2008

(65) Prior Publication Data

US 2009/0121465 A1 May 14, 2009

(30) Foreign Application Priority Data

Nov. 7, 2007 (DE) .......................... 10 2007 053 101

(51) Int. Cl.
*B60R 21/26* (2011.01)

(52) U.S. Cl. ..................... 280/741; 280/728.2; 280/736

(58) Field of Classification Search ................. 280/741, 280/728.2, 736, 740
See application file for complete search history.

(56) References Cited

U.S. PATENT DOCUMENTS

| | | | | |
|---|---|---|---|---|
| 3,968,980 | A * | 7/1976 | Hay ............................... | 280/734 |
| 5,536,041 | A | 7/1996 | Acker et al. | |
| 5,700,030 | A * | 12/1997 | Goetz ........................... | 280/736 |
| 5,799,969 | A * | 9/1998 | Coleman et al. ............ | 280/728.2 |
| 6,007,097 | A * | 12/1999 | Rink et al. .................... | 280/737 |
| 6,092,833 | A * | 7/2000 | Nariyasu ..................... | 280/728.2 |
| 6,193,270 | B1 * | 2/2001 | Thomas ....................... | 280/728.2 |
| 6,227,560 | B1 * | 5/2001 | Volkmann et al. .......... | 280/728.2 |
| 6,270,113 | B1 * | 8/2001 | Wipasuramonton et al. ........................... | 280/730.2 |
| 6,676,157 | B2 * | 1/2004 | Nanbu ......................... | 280/736 |
| 6,860,506 | B2 * | 3/2005 | Ogata et al. ................. | 280/730.2 |
| 7,357,414 | B2 | 4/2008 | Huperz | |
| 7,431,335 | B2 * | 10/2008 | Khandhadia et al. ......... | 280/737 |
| 7,819,424 | B2 * | 10/2010 | Toda et al. .................. | 280/730.2 |
| 2003/0141703 | A1 * | 7/2003 | Fowler et al. ............... | 280/728.2 |
| 2005/0225058 | A1 * | 10/2005 | Braun ......................... | 280/728.2 |
| 2005/0248138 | A1 * | 11/2005 | Crohn et al. ................ | 280/740 |
| 2006/0125220 | A1 * | 6/2006 | Crohn et al. ................ | 280/742 |
| 2006/0170202 | A1 * | 8/2006 | Block et al. ................. | 280/743.2 |
| 2006/0249932 | A1 * | 11/2006 | Marriott ....................... | 280/729 |
| 2006/0261582 | A1 * | 11/2006 | Fischer et al. ............... | 280/736 |
| 2007/0222196 | A1 * | 9/2007 | Harvey et al. ................ | 280/740 |
| 2009/0189375 | A1 * | 7/2009 | Lunt et al. .................... | 280/741 |

FOREIGN PATENT DOCUMENTS

| | | |
|---|---|---|
| DE | 9408908.6 | 1/1995 |
| DE | 19548266 | 6/1997 |
| DE | 10201002 | 7/2003 |

* cited by examiner

*Primary Examiner* — Ruth Ilan
*Assistant Examiner* — Karen A Beck
(74) *Attorney, Agent, or Firm* — Tarolli, Sundheim, Covell & Tummino LLP

(57) ABSTRACT

A gas generator has an elongated outer housing, the wall of the outer housing surrounding at least one gas carrying inner chamber. An axially extending end section of the wall of the outer housing, which is separated from the inner chamber of the gas generator with regard to flow, is constructed as a fastening section and has at least one fastening structure for connecting the gas generator with a carrier part.

29 Claims, 4 Drawing Sheets

GAS GENERATOR AND ASSEMBLY WITH A GAS GENERATOR

FIELD OF THE INVENTION

The invention relates to a gas generator.

BACKGROUND OF THE INVENTION

Gas generators with an elongated outer housing that generally surrounds several inner chambers are used to fill passenger side- or knee gas bags. The inner chambers contain components, designated below as functional parts, e.g. pyrotechnic charges or filter materials. Various designs are known for fastening the gas generator to a carrier part. In one solution, threaded bolts projecting radially from the outer housing are welded onto the outer wall of the gas generator. Another solution makes provision to clasp the gas generator in one or more clamps which, in turn, can be screwed to the carrier part. To weld fastening bolts to the outer housing is, however, complicated and expensive, whilst the use of separate clamps increases the number of components and the required amount of material.

It is an object of the invention to simplify the fastening of a gas generator to a carrier part.

BRIEF SUMMARY OF THE INVENTION

This is achieved with a gas generator that has an elongated outer housing, the wall of the outer housing surrounding at least one gas carrying inner chamber. An axially extending end section of the wall of the outer housing, which is separated from the gas carrying inner chamber of the gas generator with regard to flow, is constructed as a fastening section and has at least one fastening structure for connecting the gas generator with a carrier part. The tubular outer housing of the gas generator surrounds all inner chambers of the gas generator, which contain functional parts, i.e. for example igniters, one or several combustion chamber(s), compressed gas containers and filter chambers or diffusers. All these functional parts and inner chambers are gas carrying, i.e. are either gas-generating or have gas generated in the gas generator flowing through them. The filling gas required for example for a gas bag is generated, prepared, filtered or carried off in them. The fastening section provided according to the invention, on the other hand, is constructed in a region of the outer housing which is separated from all these functional parts with regard to flow. The fastening section serves here solely for the fastening of the gas generator and does not fulfil any further function with regard to gas production or gas conducting.

The fastening section is preferably gas-tightly separated from the inner chamber(s).

In particular, the fastening section can be designed as an extension of the outer housing in the axial direction beyond the inner chamber(s) or the functional parts.

The fastening structure is preferably formed by at least one opening in the peripheral wall of the fastening section, which allows a simple and favourably priced manufacture. Any desired fastening element can engage on the fastening structure, in order to connect the gas generator with the carrier part. Some selected possibilities for this are described further below.

In one preferred embodiment of the invention, the fastening section is open at an axial end. At its other axial end it continues integrally into the remainder of the outer housing. In this embodiment, the fastening section may be constructed in the form of an open tube, preferably with the same diameter and wall thickness as the remainder of the outer housing.

In another preferred embodiment of the invention, the outer housing is compressed flat to form a double-walled flange in the fastening section. To do this, advantageously the region of the outer housing projecting over the inner chamber and the functional parts is shaped accordingly.

A gas generator according to the invention can be easily produced by the outer housing being produced with an axial excess with respect to a conventional gas generator, and by the outer housing, projecting at an axial end, being provided with a fastening structure. The one or more inner chamber(s) of the gas generator or its functional parts are of course closed off with respect to the environment before the activation of the gas generator, as in conventional constructions.

The fastening section is advantageously adjacent axially to an outflow region of the gas generator, because in this way the fastening of the gas generator can be carried out at a distance from the igniter, which of course has to be wired.

To fasten the gas generator to the carrier part, according to the invention an assembly is provided with a gas generator described above and with a fastening element, engaging on the fastening structure of the fastening section for fixing the gas generator on the carrier part.

The fastening element can project for example through a fastening structure which is realized in the form of two opposite openings in the peripheral wall of the fastening section, so that the gas generator can be fastened in an analogous manner to the known construction with radially projecting fastening bolts.

In another preferred embodiment, the fastening element comprises a mounting plate which is fastened to the gas generator via at least one opening in the peripheral wall of the fastening section which forms the fastening structure. Such a mounting plate can be adapted simply to different installation situations and types of vehicle, without alternations having to be carried out on the gas generator itself. A separate component must, indeed, be used here, but the flexibility of adaptation makes up for this disadvantage. The fastening then takes place in the vehicle by means of corresponding structures on the mounting plate.

One part of a screw/nut connection can be fastened rigidly on the mounting plate, thus reducing the number of individual components which are used.

In a preferred embodiment, the mounting plate is fastened to the gas generator by means of at least one blind rivet, so that a secure pre-mounting of the mounting plate on the gas generator can be carried out.

The mounting plate can also be constructed so that it is bent around in a shape in which it embraces the rim of the fastening section at the axially free end of the fastening section. In addition, the mounting plate is screwed or riveted for example separately or directly with the carrier part through aligned openings in the mounting plate and in the fastening section. The embracing of the axial end offers the advantage of a secure mounting in the axial direction.

The fastening element and the fastening structure can also be used in order to fasten a heat shield to the gas generator for the fixing of the gas generator on the carrier part.

In an analogous manner to the systems designed for gas generators with radially projecting fastening bolts, the fastening element or at least a part of the fastening element can project radially.

DETAILED DESCRIPTION OF PREFERRED EMBODIMENTS

Figure 1:
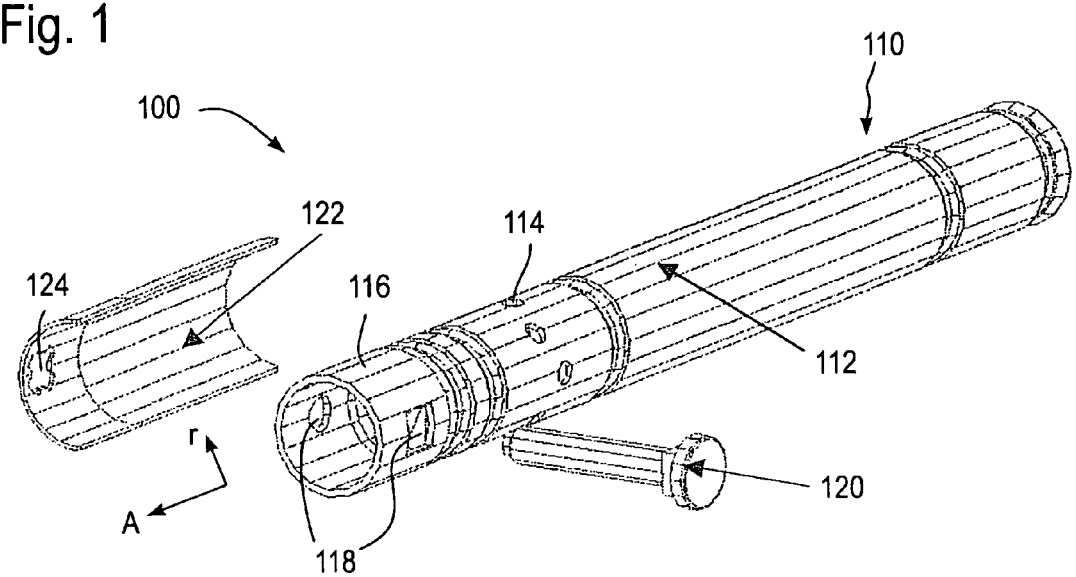
FIG. 1 shows a diagrammatic exploded view of an assembly according to the invention with a gas generator and with a fastening element according to a first embodiment.
Figure 2:
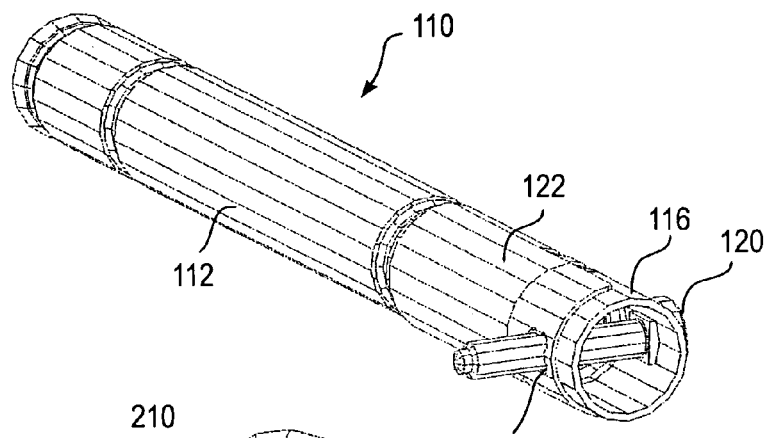
FIG. 2 shows the assembly in FIG. 1 in the assembled state.

FIG. 1 shows an assembly 100 with a gas generator 110 in accordance with a first embodiment.

The gas generator 110 is an elongated tubular gas generator and has an outer housing 112 with a tubular wall. In circumferential direction, the outer housing 112 completely surrounds at least one inner chamber (not shown), with all the known functional parts of the gas generator such as, for instance, igniters, one or more combustion chambers, one or more compressed gas containers, filter chamber(s) and a diffuser region being arranged in the inner chamber(s). The gas generator 110 preferably serves for the generation of filling gas for a gas bag.

The invention is, however, also transferable to gas generators for the operation of various tensioning devices or gas-operated piston/cylinder units.

The gas generator 110 has an outflow region 114 via which the gas generated in the gas generator 110 leaves the latter. The inner chamber(s), the functional parts and also the outflow region 114 are closed in a gas-tight manner with respect to the environment before the gas generator 110 is activated.

The outer housing 112 has an extended section, adjoining onto the outflow region 114 in the axial direction A, in which extended section the wall of the outer housing 112 continues in the axial direction A with an unchanged diameter and an unchanged wall thickness. This extended section of the wall forms a fastening section 116 which serves for the fastening of the gas generator 110 to a carrier part 10 (only indicated in FIGS. 10 and 11) which is fixed to the vehicle (not shown). The extended section is open at one axial end, whereas at the other axial end on the end wall 117 of the through-flow region 114 the extended section continues integrally into the remaining outer housing 112.

The fastening section 116 extends as an axially open, tubular extension of the outer housing 112 out from the actual end wall 117 of the gas generator 110. The end wall 117 brings about a separation, with regard to flow, of the inner chambers of the gas generator 110 from the fastening section 116, so that the fastening section 116 is separated gas-tightly from the inner chambers.

A fastening structure 118, here in the form of two opposite openings formed in the peripheral wall, is formed in the fastening section 116. A fastening element 120, in this case a screw, is inserted through the two openings of the fastening structure 118, so that it projects through the two openings and its threaded end protrudes radially from the gas generator 110.

Directly adjacent to its head, the screw of the fastening element 120 has a square, e.g. rectangular, cross-section, which engages in a form-fitting manner into the associated, likewise square, opening of the fastening structure 118 and thus secures the fastening element 120 against rotation. The same function which is fulfilled by a welded-on fastening bolt is thus achieved without a costly welding or soldering process, solely through a mechanical form fit.

The assembly 100 has, in addition, a heat shield 122 which is formed from a bent metal plate which extends approximately over half of the periphery of the outer housing 112 and is adapted in its diameter to the outer diameter of the outer housing 112. The axial length of the heat shield 122 is selected so that the latter extends from the fastening structure 118 to over the outflow region 114. The heat shield 122 is fastened via the fastening element 120 to the gas generator 110 and to the carrier part 10. It covers a portion of the outflow openings of the outflow region 114, so that outflowing filling gas does not come into contact with sensitive parts of a gas bag or of the carrier part 10. The fastening element 120 projects through an opening 124 which is provided at an axial end of the heat shield 122.

Figure 3:
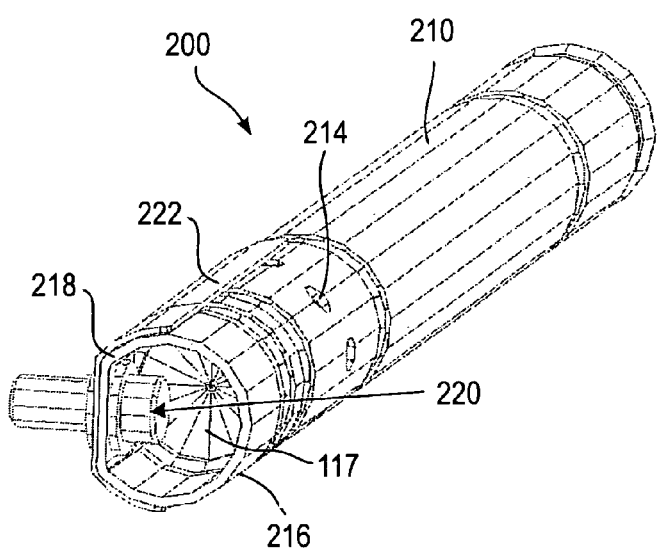
FIGS. 3 and 4 show an assembly according to the invention in accordance with a second embodiment.
Figure 4:
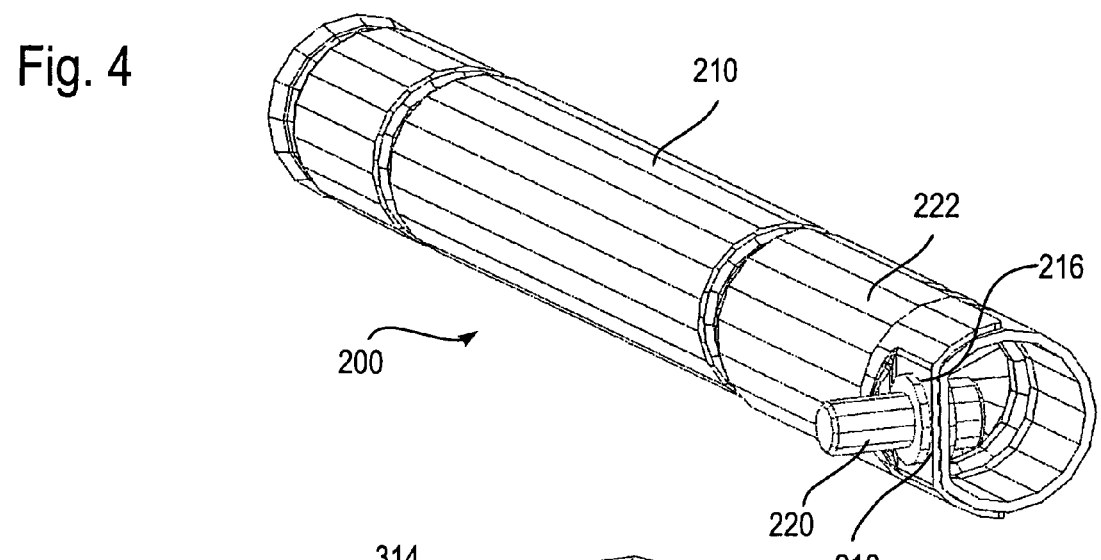

A second embodiment is shown in FIGS. 3 and 4. The assembly 200 differs from the assembly 100 which has just been described essentially by the form of the fastening structure 218 of the fastening section 216 of the gas generator 210.

Here, the fastening element 220 is realized by a screwed rivet which is pressed into a flattened region of the outer wall in the fastening section 216 into an opening serving as fastening structure 218. In the same working operation, the heat shield 222 is also fastened to the gas generator 210. The radially projecting thread section of the screwed rivet serves for fastening on the carrier part.

Figure 5:
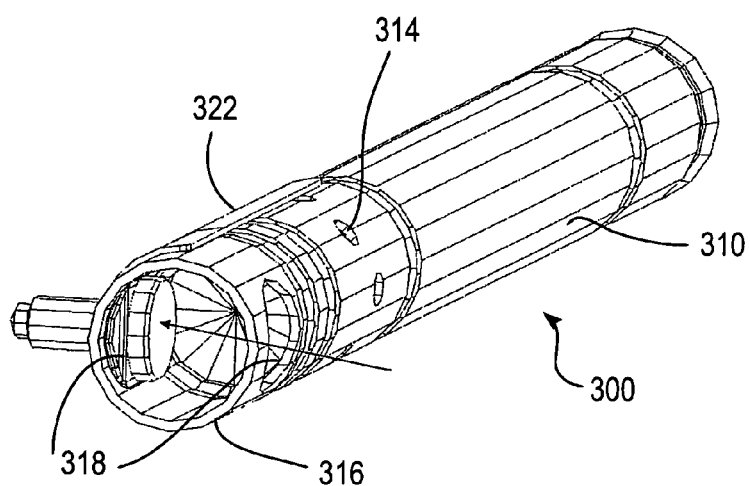
FIGS. 5 and 6 show an assembly according to the invention in accordance with a third embodiment.
Figure 6:
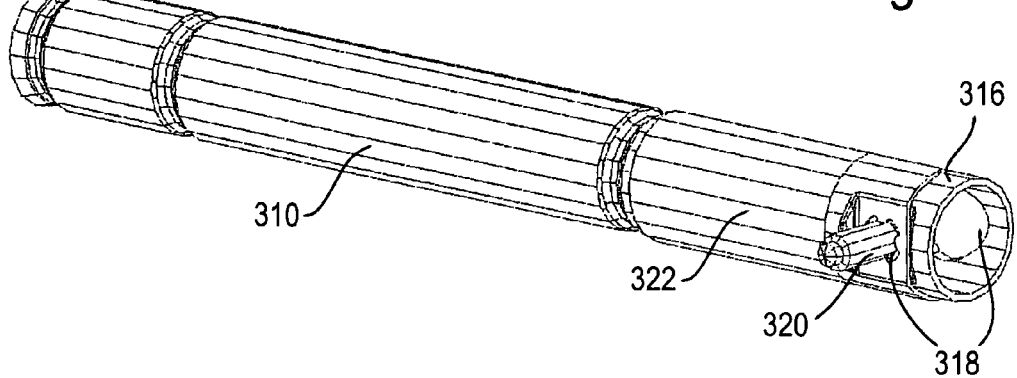

A similar construction is shown in the embodiment shown in FIGS. 5 and 6.

In the case of the third embodiment, two opposite openings are provided as fastening structure 318 and a press-in screw of the fastening element 320 is pressed into one of the openings and is thus securely connected with the wall of the fastening section 316.

A heat shield 322 is also provided again here, which is securely connected to the gas generator 310 via the fastening element 320.

Figure 7:
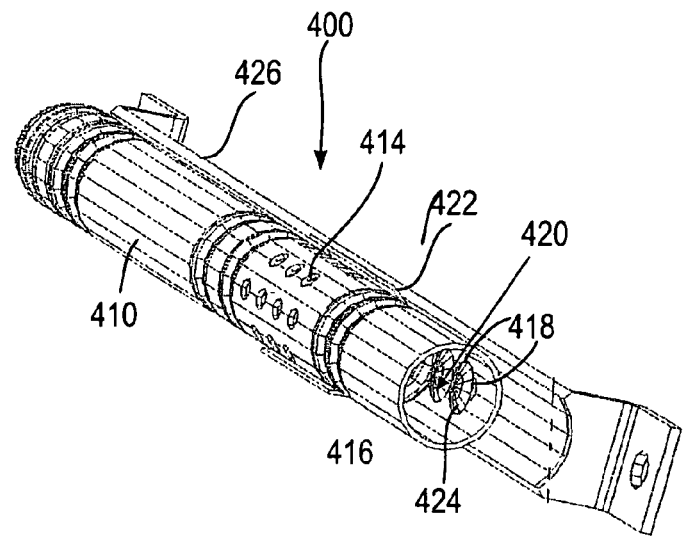
FIGS. 7 and 8 show an assembly according to the invention in accordance with a fourth embodiment.
Figure 8:
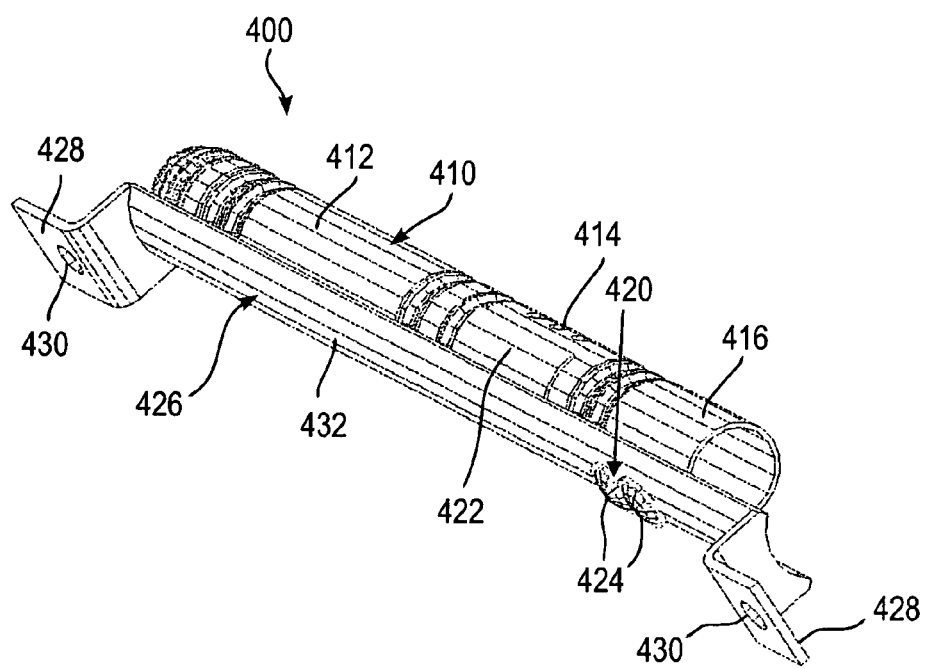

A further embodiment is illustrated in FIGS. 7 and 8.

In the assembly 400, the fastening element 420 has in addition to two blind rivets 424 a mounting plate 426 which is separate from the fastening section 416 and the gas generator 410. The mounting plate 426 is constructed as an elongated sheet metal strip which is angled at its two axial ends so that two fastening surfaces 428 are formed running parallel to a middle part. An opening 430 is formed respectively in these fastening surfaces 428, via which the mounting plate 426 can be connected with the carrier part 10. The middle part 432, on the other hand, has a dish shape which is adapted to the curvature of the outer housing 412 of the gas generator 410. The mounting plate 426 is securely connected with the gas generator 410 via the fastening elements 420 which are constructed in the form of two blind rivets. The blind rivets engage here on the fastening structure 418, which is constructed in the form of two openings lying in the wall of the fastening section 416 adjacent to each other in the axial direction.

A section 422 of the mounting plate 426, which is extended in the peripheral direction, is constructed as a heat shield and covers a part of the outflow region 414.

Figure 9:
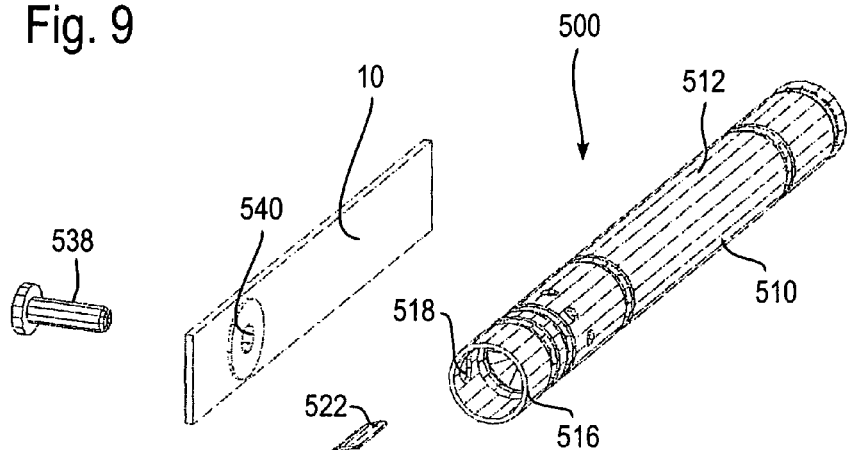
FIG. 9 shows a diagrammatic exploded view of an assembly according to the invention in accordance with a fifth embodiment.
Figure 10:
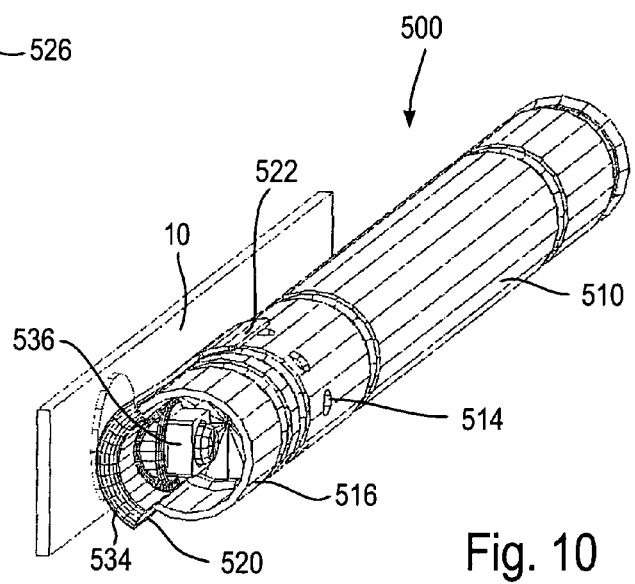
FIG. 10 shows the assembly in FIG. 9 in the assembled state.
Figure 11:
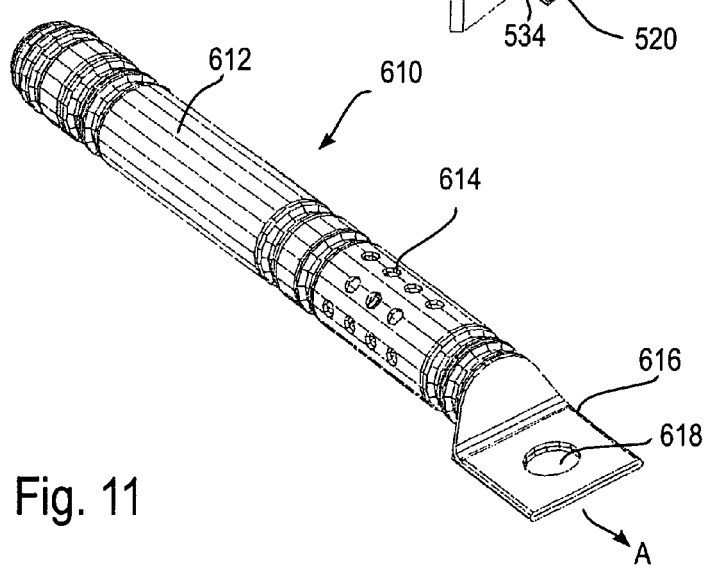
FIG. 11 shows a gas generator according to the invention in accordance with a further embodiment.

A fifth embodiment is shown in FIGS. 9 and 10.

The fastening element 520 of the assembly 500 comprises a mounting plate 526 which has the form of a bent sheet metal strip. The mounting plate 526 is folded back on itself in the axial direction, so that two layers are lying one over the other on a third of its length. The two sheet metal layers are, in addition, curved in adaptation to the radius of the outer housing 512 of the outer housing 512 of the gas generator 510. The mounting plate 522 is pushed at its axially open end onto the fastening section 516 of the gas generator 510 so that the closed end rim 534 lies against the end of the wall section of the fastening section 516 and embraces it.

The fastening structure 518 in this case again consists of a single opening in the peripheral wall of the fastening section 516. The mounting plate 526 has two openings which are in alignment with each other and are in alignment with the opening of the fastening structure 518 when the mounting plate 526 is pushed onto the fastening section 516. A component of a screw/nut connection, in this case the nut 536, is fastened rigidly and permanently on the concave side of the mounting plate 526. The nut 536 can, for example, be welded to the mounting plate 526 or can be pressed into the latter.

As in the previous embodiment, a section of the mounting plate 526 extending in the peripheral direction further than the remainder of the mounting plate 526 is constructed as a heat shield 522, which covers a part of the outflow openings of the outflow region 514 which are directed toward the carrier part 10.

To fasten the gas generator 510 on the carrier part 10, the mounting plate 522 is placed onto the fastening section 516 and the second part of the screw/nut connection, in this case the screw 528, is inserted through an opening 540 in the carrier part 10 and screwed with the nut 536.

The embodiment shown in FIG. 12 differs from what has been described hitherto in that the fastening section 616 of the gas generator 610 is not constructed in a tubular shape. Here, the originally tubular wall of the outer housing 612 is compressed to form a double-walled flange. The fastening structure 618 is formed by openings in the two wall sections which lie one over the other. A fastening element such as a screw, a blind rivet or another of the described possibilities can be used, in order to connect the gas generator 610 with the carrier part 10 via the fastening structure 618.

Of course, the illustrated and described embodiments of the fastening section and of the fastening element used only constitute a small range of examples. The specialist in the art can determine any other suitable geometries for the fastening structure and the fastening element and can also combine with each other and exchange for each other all features of those shown, as desired.

The invention claimed is:

1. A gas generator comprising:
an elongated outer housing (112) has a wall that defines at least one gas carrying inner chamber and an outflow region of the gas generator,
an axially extending end section of the wall of the outer housing (112) being provided, which adjoins the outflow region in the axial direction and is separated from the inner chamber of the gas generator (110) with regard to flow,
and which is constructed as a fastening section (116) and has at least one fastening structure (118) for connecting the gas generator (110) with a carrier part (10).

2. The gas generator according to claim 1, wherein the fastening section (116) is gas-tightly separated from the inner chamber.

3. The gas generator according to claim 1, wherein the fastening structure (118) is formed by at least one opening in a peripheral wall of the fastening section (116).

4. The gas generator according to claim 1, wherein the fastening section (116) is open at an axial end.

5. A gas generator comprising:
an elongated outer housing (112) and
at least one gas carrying inner chamber,
a wall of the outer housing surrounding the at least one gas carrying inner chamber and an outflow region,
an axially extending end section of the wall of the outer housing (112) being provided, which adjoins the outflow region in the axial direction and is separated from the inner chamber of the gas generator (110) with regard to flow,
and which is constructed as a fastening section (116) and has at least one fastening structure (118) for connecting the gas generator (110) with a carrier part (10), wherein in the fastening section (616) the outer housing (612) is compressed flat to form a double-walled flange.

6. The gas generator according to claim 1, wherein the fastening section (116) is axially adjacent to an outflow region (114) of the gas generator (110).

7. An assembly comprising:
a gas generator having an elongated outer housing (112) with a wall that defines at least one gas carrying inner chamber and an outflow region of the gas generator, an axially extending end section of the wall of the outer housing (112) adjoining the outflow region in the axial direction and being separated from the inner chamber of the gas generator (110) with regard to flow and which is constructed as a fastening section (116) and has at least one fastening structure (118),
and a fastening element (120), engaging on the fastening structure (118) of the fastening section (116), for fixing the gas generator (110) on a carrier part (10).

8. The assembly according to claim 7, wherein the fastening element (120) projects through two opposite openings in the wall of the fastening section (116).

9. The assembly according to claim 7, wherein the fastening element comprises a mounting plate which is fastened to the gas generator via at least one opening in the peripheral wall of the fastening section.

10. The assembly according to claim 9, wherein one part of a screw/nut connection is rigidly fastened to the mounting plate.

11. The assembly according to claim 9, wherein the mounting plate is fastened to the gas generator by means of at least one blind rivet.

12. The assembly according to claim 9, wherein the mounting plate is bent so that it embraces the rim of the fastening section at the axially free end of the fastening section.

13. The assembly according to claim 7, wherein a heat shield (122) is fastened to the gas generator (110) via the fastening element (120).

14. The assembly according to claim 7, wherein the fastening element (120) projects radially from the gas generator (110).

15. A gas generator comprising:
an elongated outer housing having a wall that defines at least one gas carrying inner chamber and an outflow region of the gas generator, the inner chamber being for supporting functional parts of the gas generator necessary for generating a filling gas for a gas bag,
an end section of the wall of the outer housing that extends axially beyond the inner chamber and adjoins the outflow region being constructed as a fastening section comprising at least one fastening structure for connecting the gas generator with a carrier part.

16. The gas generator according to claim 1, wherein the fastening section (116) continues integrally into a remainder of the outer housing.

17. The gas generator according to claim 1, wherein the wall of the outer housing is for directing flow through the at least one gas carrying inner chamber.

18. The assembly according to claim 7, wherein the fastening section (116) continues integrally into a remainder of the outer housing.

19. The assembly according to claim 7, wherein the wall of the outer housing is for directing flow through the at least one gas carrying inner chamber.

20. The gas generator according to claim 15, wherein the fastening section (116) continues integrally into a remainder of the outer housing.

21. The gas generator according to claim 15, wherein the wall of the outer housing is for directing flow through the at least one gas carrying inner chamber.

22. The gas generator according to claim 15, wherein the end section of the wall is separated from the inner chamber of the gas generator with regard to flow.

23. A gas generator comprising:
an elongated outer housing (112) and
at least one gas carrying inner chamber,
a tubular wall of the outer housing defining the at least one gas carrying inner chamber and an outflow region of the gas generator,
an axially extending end section of the wall of the outer housing (112) being provided, which adjoins the outflow region in the axial direction and is separated from the inner chamber of the gas generator (110) with regard to flow,
and which is constructed as a fastening section (116) and has at least one fastening structure (118) for connecting the gas generator (110) with a carrier part (10), the entire fastening section (116) having a circular cross-section.

24. The gas generator according to claim 23, wherein the fastening section (116) has the same diameter as a remainder of the outer housing (112).

25. The gas generator according to claim 23, wherein the fastening section (116) has the same wall thickness as a remainder of the outer housing (112).

26. A gas generator comprising:
an elongated outer housing (112) having an axially extending tubular side wall,
a first axial portion of the tubular side wall defining at least one gas carrying inner chamber of the gas generator,
a second axial portion of the tubular side wall defining an outflow region of the gas generator,
a third axial portion of the tubular side wall defining a fastening section of the gas generator, the fastening section (116) comprising at least one fastening structure (118) for connecting the gas generator (110) with a carrier part (10).

27. The gas generator according to claim 26, wherein the fastening section (116) is separated from the inner chamber of the gas generator with regard to flow.

28. The gas generator according to claim 1, wherein the outer housing (112) is tubular and substantially uniform in diameter along its length, the at least one gas carrying inner chamber, outflow region, and fastening section (116) comprising axially extending sections of the tubular outer housing.

29. The gas generator according to claim 1, wherein the fastening structure comprises at least one aperture in a side wall of the outer housing (112).

* * * * *